United States Patent [19]

Schaer

[11] 4,204,034
[45] May 20, 1980

[54] ELECTROCHEMICAL CELL

[75] Inventor: Glenn R. Schaer, Columbus, Ohio

[73] Assignee: Battelle Memorial Institute, Columbus, Ohio

[21] Appl. No.: 947,649

[22] Filed: Oct. 2, 1978

[51] Int. Cl.$^2$ ............................................. H01M 2/12
[52] U.S. Cl. .................................... 429/54; 429/99; 429/200; 429/203; 429/220; 429/228
[58] Field of Search ............... 429/220, 225, 228, 199, 429/200, 203, 54, 94

[56] References Cited

U.S. PATENT DOCUMENTS

| | | | |
|---|---|---|---|
| 2,269,040 | 1/1942 | Rublee | 429/220 X |
| 3,440,100 | 4/1969 | Gumucio et al. | 429/220 X |
| 3,770,507 | 11/1973 | Weissman | 429/228 X |
| 4,001,037 | 1/1977 | Beck | 429/228 X |
| 4,074,027 | 2/1978 | Akers et al. | 429/220 X |
| 4,074,029 | 2/1978 | Ruben | 429/203 X |

Primary Examiner—Charles F. LeFevour
Attorney, Agent, or Firm—Philip M. Dunson

[57] ABSTRACT

A rechargeable electrochemical cell (10 in FIG. 1) has a negative electrode (11) with an active surface (11') of copper; a positive electrode (12) with an active surface (12') of lead dioxide, spaced therefrom; in an aqueous acid electrolyte (13) of fluoboric, fluosilicic, sulfamic, or perchloric acid, in which both divalent copper and divalent lead ions are soluble during discharging, and from which smooth and adherent deposits may be obtained during charging; and a container (14) with an electrically nonconductive inner surface (14') that is chemically resistant to the electrolyte (13).

A similar cell (30 in FIG. 5) comprises also bipolar electrodes (32,31) similar in shape to the negative electrode (31) and the positive electrode (32), positioned between them and substantially parallel to them. As in FIG. 2, the container may comprise a fluid-tight enclosure (24,25) with an optional pressure relief valve (28).

12 Claims, 5 Drawing Figures

ELECTROCHEMICAL CELL

TECHNICAL FIELD

This invention relates to electrochemical cells, and particularly to a rechargeable battery cell that typically comprises a copper sheet and a lead dioxide-coated copper sheet as negative and positive electrodes, respectively, immersed in an electrolyte comprising an aqueous solution of fluoboric or fluosilicic acid containing divalent ions of copper and lead.

The cell is characterized by simplicity of design, availability and low cost of active materials, and the ability to be recharged and discharged at current densities about twice those obtained with conventional lead dioxide-lead (lead-acid) cells based upon geometric areas of the electrodes. ("Geometric area" is used herein to mean the length times the width of the electrode as distinguished from the actual surface area, which may be different, and difficult to determine, for some surfaces.) High performance and simplicity of design are achieved by using two compatible electrodes of the first kind (metal or compounds in contact with their corresponding metal ions in solution) and like metals for the electrode supports and current collectors.

BACKGROUND

In the art of manufacturing secondary storage batteries that are suitable for storing electrical energy by means of a chemical reaction for stationary, vehicular, and other consumer applications, reactants are normally chosen which have the largest theoretical energy capacity per unit of weight or largest theoretical energy capacity per unit of volume. The lead-lead dioxide-sulfuric acid (lead-acid) system is an example of high energy content reactants. However, of the lead present in a typical cell, less than half is available in active form for chemical energy storage reactions. The other lead is present in inactive form as electrode supports and electrical connections. This conventional lead-acid cell has further disadvantages in that during discharge, the lead products are insoluble salts which cause an additonal internal electrical resistance and subsequent loss of energy. Some of the insoluble product, lead sulfate, is shed from the electrodes leading to a permanent loss of capacity, partly because of the volume changes which occur in the active electrode materials as they are discharged.

DISCLOSURE

The present invention comprises an electrochemical storage system using lead and copper as the reactants in a suitable acid electrolyte. All of the reactants are soluble in a discharged state so that no resistance is formed by insoluble products blocking the electrical path. High discharge rates are therefore possible. During discharge if particles are shed from the electrodes, when they settle to the bottom of the cell they will react with each other and redissolve so that no net loss in capacity is encountered. During cycling, efficiencies are close to 100 percent because solid state reactions are not necessary to change the active materials from the charged to discharged state and vice versa. With conventional lead-acid cells, the rate and extent of these solid state reactions limits the active material utilization to only about 50 to 60 percent. With the lead dioxide-copper cell of this invention, the nearly 100 percent utilization means that a sealed cell can be achieved. Only oxygen is generated during overcharge, which will dissolve in the electrolyte and recombine with the copper electrode active material. No execessive build up in gas pressure occurs, which would be detrimental for a sealed cell design.

The combination of lead and copper is advantageous because each element has little iterference with the other. Cooper deposited on the negative electrode is over 99 percent copper (typically only about 0.2 weight percent lead by analysis). It is well known that lead dioxide deposited on a positive electrode is likewise essentially pure.

The combination of copper with lead dioxide in acid solution gives an electrochemical couple with a calculated theoretical open-circuit voltage of 1.118 V. The measured value is approximately 1.17 V. Although this voltage is only about one half of that of the conventional lead-acid battery, the utilization of the active electrode materials is approximately double. Hence the practical energy density of the two systems is comparable. The voltage of the lead dioxide-copper cell is also comparable to that obtained with many other conventional and advanced cell systems such as nickel hydrated oxide-cadmium (nickel-cadmium); mercury oxide-cadmium (mercury-cadmium); nickel hydrated oxide-iron (nickel-iron); and nickel hydrated oxide-zinc (nickel-zinc).

SUMMARY

A typical rechargeable elecrochemical cell according to the present invention comprises a negative electrode having an active surface comprising essentially copper; a positive electrode having an active surface comprising essentially lead dioxide, spaced from the negative electrode; an aqueous acid electrolyte in which both divalent copper and divalaent lead ions are soluble during discharging, and from which smooth and adherent deposits may be obtained during charging, in contact with the electrodes, and a container for the electrolyte and the electrodes, having an electrically nonconductive inner surface that is chemically resistant to the electrolyte.

The electrolyte typically comprises essentially fluoboric, fluosilicic, sulfamic, or perchloric acid; preferably fluoboric acid or fluosilicic acid. The electrodes typically comprise planar members positioned substantially parallel to each other; cylindrical members positioned substantially coaxially; or interwound spirals, in edge view.

The cell may comprise also at least one bipolar electrode similar in shape to the negative and positive electrodes, positioned between them and substantially parallel to them. The container typically comprises a fluid-tight enclosure, and may include pressure relief means.

DRAWINGS

MODES AND EMBODIMENTS

Figure 1:
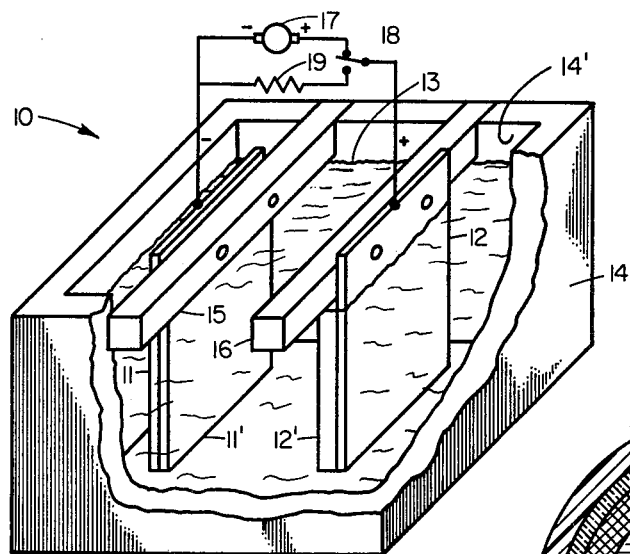
FIG. 1 is a partly schematic perspective view, partly cut away, showing a typical embodiment of the present invention and typical associated circuitry.

Referring now to FIG. 1, a typical embodiment 10 of the present invention comprises initially a copper sheet as the negative electrode base 11; a corrosion resistant positive electrode base 12 such as a nickel-plated copper sheet; an electrolyte 13 containing fluoboric acid, soluble fluoborates of lead and copper, and water; a container 14 for the electrolyte, and insulating supports 15, 16 for the electrodes.

During the first charging of the cell 10, via a direct voltage source 17 and a switch 18, an active coating 11' of copper is plated on the negative electrode base 11, while an active coating 12' of lead dioxide is plated on the positive electrode base 12. Electrical energy is thus stored in the device 10, which may subsequently be discharged by connecting the switch 18 to a load 19, to recover the stored energy as electrical energy.

Any compatible conductive material may be used as the electrode bases 11,12 depending on whether electrical conductivity, availability, and cost are considered to be important factors. Such materials include copper, nickel, aluminum, iron, various other metals, alloys, carbon, graphite, platinum coated titanium, etc. Similarly, solid or open structures may be used for the electrode bases 11,12, depending on whether cost and weight are considered to be important. Any acid that permits smooth adherent coatings of copper and lead dioxide to be obtained, and in which copper and lead cations are soluble, may be used as the electrolyte 13. Such electrolytes 13 include fluoboric, fluosilicic, sulfamic, and perchloric acid.

Any number of electrodes may be used in each cell depending on the desired ampere-hour capacity. The electrodes 11,12 typically are planar, with the container 14 having the shape of a parallelopiped, as in the cell 10 of FIG. 1.

Figure 3:
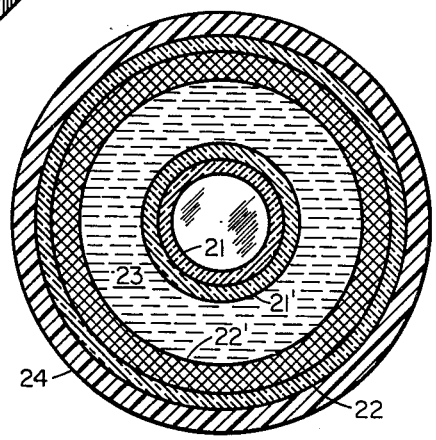
FIG. 3 is a view in horizontal section of the embodiment in FIG. 2.
Figure 4:
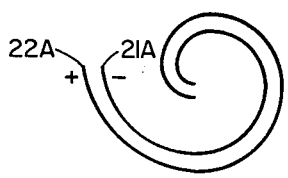
FIG. 4 is a schematic top (edge) view of a typical alternative shape for electrodes in a cylindrical cell as in FIGS. 2 and 3.
Figure 2:
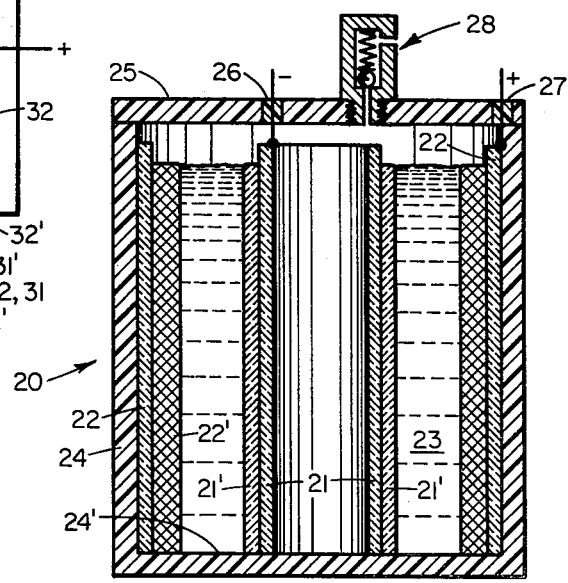
FIG. 2 is a view in vertical section, and partly schematic, showing another typical embodiment of the present invention.

In the cylindrical cell 20 of FIGS. 2 and 3, the negative electrode base 21 and the positive electrode base 22 typically are coaxial cylinders as shown. Or the negative and positive electrode bases in a cylindrical cell may comprise interwound spirals 21A,22A respectively, as in FIG. 4, wound to any desired number of spaced turns, with insulating spacers at each end (not shown). The cylindrical cell 20 in FIGS. 2 and 3 of course includes also an electrolyte 23, and a container 24, typically including a cover 25 to make the cell fluid-tight. A fluid-tight bushing 26 where the negative terminal is fed through, and a similar bushing 27 where the positive terminal is fed through, typically are provided, as well as a pressure relief valve 28 or other equivalent pressure relief means, in the cover 25. Hermetic sealing may of course be provided in any embodiment of the invention. The likelihood of high pressure is very small, so the pressure relief means 28 may be omitted wherever the consequences of leakage would not be serious.

The cylindrical cell 20 typically is connected similarly to the cell 10 of FIG. 1 for charging and discharging. The first charging of the cell 20 provides the active coatings 21' and 22' on the electrodes 21,22 as shown in FIGS. 2 and 3, or like active coatings (not shown) on the electrodes 21A,22A in FIG. 4.

Figure 5:
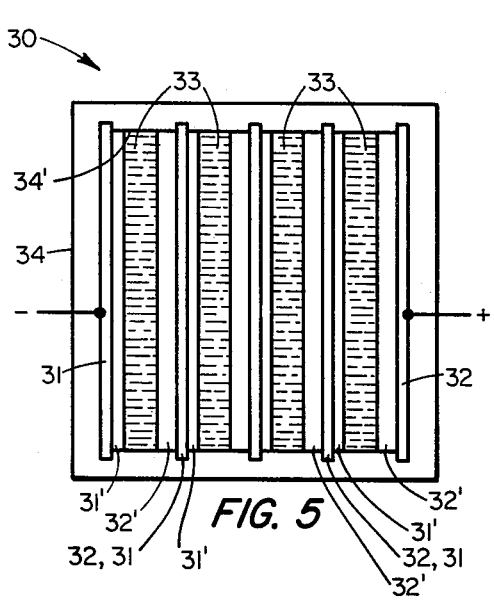
FIG. 5 is the top view, partly schematic, of another typical embodiment of the invention.

FIG. 5 is a top view of a cell 30 that is similar in shape to the cell 10 of FIG. 1. The negative electrode base 31 is planar and fits in a slot at the left end of the container 34. The positive electrode base 32 also is planar and fits in a slot at the right end of the container 34. Any desired number of bipolar electrode bases 32,31 also are planar and fit in slots parallel to, and equally spaced between, the end electrodes 31 and 32. An electrolyte 33 fills the spaces between the electrodes in the container 34.

During the first charging of the cell 30, an active coating 31' of copper is plated on the righthand surface of the negative electrode base 31, and a similar coating 31' is plated on the righthand surface of each bipolar electrode 32,31. At the same time, an active coating 32' of lead dioxide is plated on the lefthand surface of the positive electrode base 32 and on the lefthand surface of each bipolar electrode 32,31. The cell 30 of FIG. 5 typically is connected as shown in FIG. 1 for charging. Electrical energy is thus stored in the cell 30, which may subsequently be discharged to any desired degree by connecting the switch 18 to the load 19, to recover the stored energy as electrical energy.

In all embodiments of the invention, the cells may be charged, discharged, recharged, discharged, etc. repeatedly.

EXAMPLES

The following examples illustrate certain aspects of the invention.

EXAMPLE I

A cell similar to the cell 10 in FIG. 1 was set up with three copper window screen electrodes 11,12,11 measuring 5×5 inches (12.7×12.7 cm) and spaced about 1 inch (2.5 cm) apart. An electrolyte 13 consisting of 38.4 fl oz/gal (300 ml per liter) of 45 percent by weight commercial copper fluoborate concentrate; 47.1 fl oz/gal (368 ml per liter) of 51–52 percent by weight lead fluoborate concentrate ($PbBF_4$); and 42.5 fl oz/gal (332 mil per liter) distilled water, was made and 47.3 fl oz (1400 ml) was used to fill a cell. The screens were cleaned free from grease and oxides and one was plated with about 0.0001 inch (2.5 um) of nickel. These electrodes 11,12,11 were immersed in the electrolyte with the nickel-plated electrode 12 in the center and connected to a positive terminal of a DC power source. Charging was carried out for 8.5 hours with a current of 5 amperes and a cell voltage of about 1.75 volts to build up a smooth, adherent coating 11' of copper on each negatively charged electrode 11, and a smooth adherent deposit 12' of lead dioxide on the positively charged electrode 12. The cell was discharged at a cell voltage of 1.0 volts, and a current of 30 amperes was delivered. This is equal to a current density of 86 amperes per square foot (9.26 amperes per square decimeter) or about 3 times the maximum current density obtainable in a lead-acid battery.

EXAMPLES II THROUGH IX

A cell similar to that of Example I was set up with 1.0×1.0 inch (2.54 cm×2.54 cm) electrodes, two negative and one central positive. A platinum screen was used for the positive electrode and copper foil was used for the negative electrodes in an electrolyte containing 7.6 fl oz (225 ml) of 45 percent by weight copper fluoborate concentrate, and 9.3 fl ox (275 ml) of 51–52 percent by weight lead fluoborate concentrate. The electrodes were charged at 0.19 am/in$^2$ (0.029 amp/cm$^2$) for 6080 coulombs (ampere-seconds) to produce electrodes. The current density calculation was based on a geometric area of 1 inch×1 inch and a total current of 0.19 ampere. The electrodes were then cycled by charging and discharging at different current densities, and weight changes were measured, and coulombic efficiencies were calculated. The results of these experiments are listed in the following table. Each charging or discharge step was continued until 3038 coulombs of current had passed (e.g., cycling to a 50 percent depth of discharge). Electrolyte temperature was 70 F (21 C).

| Example Number | Geometric Current Density | | Mode of Cycle | Measured Coulombic Efficiencies,% | |
|---|---|---|---|---|---|
| | Amp/in$^2$ | Amp/dm$^2$ | | Negative Electrode | Positive Electrode |
| II | 0.4 | 6 | Discharge | 104 | 111 |
| III | 0.4 | 6 | Charge | 98 | 100 |
| IV | 0.26 | 4 | Discharge | 103 | 110 |
| V | 0.26 | 4 | Charge | 97.9 | 100 |
| VI | 0.13 | 2 | Discharge | 102 | 105 |
| VII | 0.13 | 2 | Charge | 97 | 98 |
| VIII | 0.06 | 1 | Discharge | 100 | 103 |
| IX | 0.06 | 1 | Charge | 95 | 96 |

INDUSTRIAL APPLICABILITY

The present invention has potential uses in industrial application such as (1) storage of electrical energy generated during off-peak periods and regeneration of the electrical energy during peak periods (electric utility load leveling); (2) storage of energy for motive power in electric vehicles; and (3) storage of electrical energy in sealed cells for portable electronic appliances and tools.

To summarize, as shown in the drawings, a typical rechargeable electrochemical cell 10,20, or 30 according to this invention comprises a negative electrode 11,21,22A, or 31 having an active surface 11′,21′, or 31′ comprising essentially copper; a positive electrode 12,22,22A, or 32 having an active surface 12′,22′, or 32′ comprisig essentially lead dioxide, spaced from the negative electrode 11,21,21A, or 31, an aqueous acid electrolyte 13,23, or 33 in which both divalent copper and divalent lead ions are soluble during discharging, and from which smooth and adherent deposits may be obtained during charging, in contact with the electrodes; and a container 14,24, or 34 for the electrolyte and the electrodes, having an electrically nonconductive inner surface 14′,24′, or 34′ that is chemically resistant to the electrolyte 13,23, or 33.

The electrolyte 13,23 or 33 typically comprises essentially fluoboric, fluosilicic, sulfamic, or perchloric acid; preferably fluoroboric acid or fluosilicic acid. The electrodes typically comprise planar members 11,12 positioned substantially coaxially, as in FIGS. 2 and 3; or interwound spirals, in edge view, 21A,22A, as in FIG. 4.

As shown in FIG. 5, the cell 30 may comprise also at least one bipolar electrode 32,31 similar in shape to the negative electrode 31 and the positive electrode 32, positioned between them and substantially parallel to them. In the cell 30 of FIG. 5, all of the electrodes comprise planar members 31;32,31; and 32; positioned sybstantially parallel to each other. Alternatively they may all comprise cylindrical members positioned substantially coaxially in a cylindrical container, as in FIGS. 2 and 3; or interwound spirals, in edge view, as in FIG. 4.

As shown in FIG. 2, the container may comprise a fluid-tight enclosure 24,25, optionally having pressure relief means 28.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A rechargeable electrochemical cell comprising
   a negative electrode having an active surface comprising essentially copper;
   a positive electrode having an active surface comprising essentially lead dioxide, spaced from the negative electrode;
   an aqueous acid electrolyte comprising essentially fluoboric, fluosilicic, sulfamic, or perchloric acid, in which both divalent copper and divalent lead ions are soluble during discharging, and from which smooth and adherent deposits may be obtained during charging, in contact with the electrodes; and
   a container for the electrolyte and the electrodes, having an electrically nonconductive inner surface that is chemically resistant to the electrolyte.

2. A cell as in claim 1, wherein the electrolyte comprises essentially fluoboric acid.

3. A cell as in claim 1, wherein the electrolyte comprises essentially fluosilicic acid.

4. A cell as in claim 1, wherein the electrodes comprise planar members positioned substantially parallel to each other.

5. A cell as in claim 1, wherein the electrodes comprise cylindrical members positioned substantially coaxially.

6. A cell as in claim 1, wherein the electrodes comprise interwound spirals, in edge view.

7. A cell as in claim 1, comprising also at least one bipolar electrode similar in shape to the negative and positive electrodes, positioned between them and substantially parallel to them.

8. A cell as in claim 7, wherein the electrodes comprise planar members positioned substantially parallel to each other.

9. A cell as in claim 7, wherein the electrodes comprise cylindrical members positioned substantially coaxially.

10. A cell as in claim 7, wherein the electrodes comprise interwound spirals, in edge view.

11. A cell as in claim 1, wherein the container comprises a fluid-tight enclosure.

12. A cell as in claim 11, wherein the container includes pressure relief means.

* * * * *